M. LANDRIN.
AUTOMOBILE CULTIVATOR WITH ROTATIVELY DRIVEN CULTIVATING DISKS.
APPLICATION FILED NOV. 11, 1911.
1,055,765.
Patented Mar. 11, 1913.
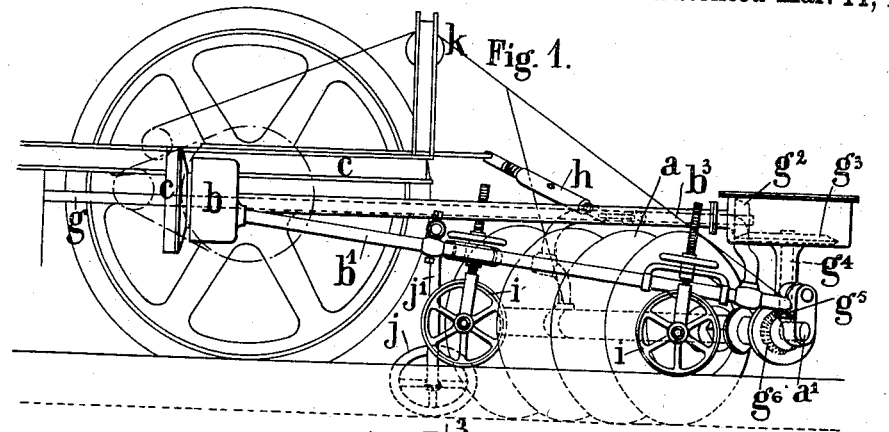
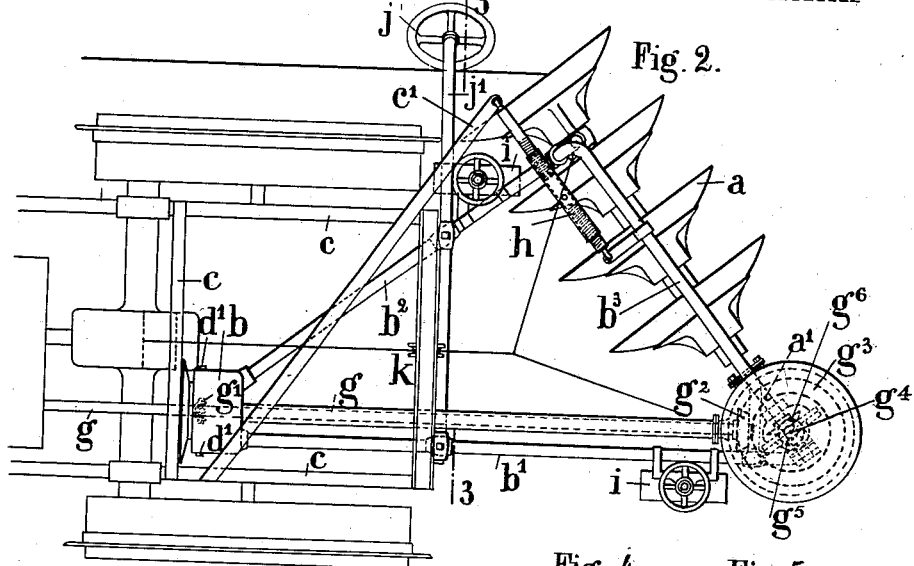
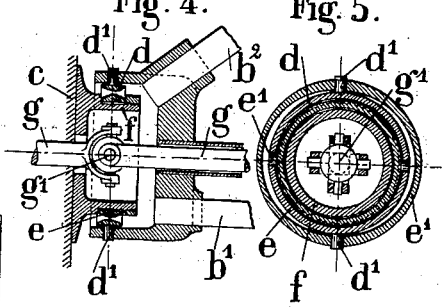
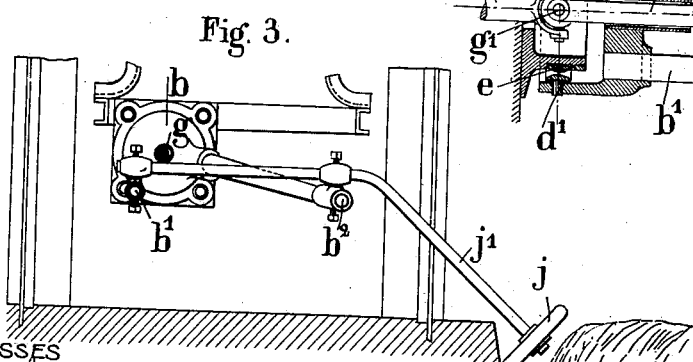
INVENTOR
Marcel Landrin
BY Munn Co
ATTORNEYS
WITNESSES

UNITED STATES PATENT OFFICE.

MARCEL LANDRIN, OF SOISSONS, FRANCE.

AUTOMOBILE CULTIVATOR WITH ROTATIVELY-DRIVEN CULTIVATING-DISKS.

1,055,765.  Specification of Letters Patent.  Patented Mar. 11, 1913.

Application filed November 11, 1911. Serial No. 659,692.

*To all whom it may concern:*

Be it known that I, MARCEL LANDRIN, a citizen of the Republic of France, and a resident of Place Mantoue, at Soissons, Department of Aisne, France, have invented certain new and useful Improvements in Automobile Cultivators with Rotatively-Driven Cultivating-Disks, of which the following is a specification.

This invention relates to improvements in automobile cultivators in which the cultivating disks, rotatively-driven by the engine of the tractor, are mounted upon a frame pivoted to the tractor-frame. These improvements comprise the following features:—(1) The cultivator-frame is connected to the tractor-frame by a universal pivot device, in order to allow the tractor to oscillate in accordance with the irregularities of the ground without affecting the working position of the cultivator-frame. (2) The shaft carrying the cultivating disks is adjustable in direction in relation to the line of travel. These improvements are represented upon the annexed drawing, in which:—

Figure 1 is an elevation of the rear portion of the cultivator. Fig. 2 is a corresponding plan. Fig. 3 is an end view in section upon line 3—3 of Fig. 2. Figs. 4 and 5 are details in longitudinal and transverse section, showing the device connecting the cultivator-frame to the tractor-frame.

The mold-disks $a$ are mounted upon a spindle $a'$ at the rear of a triangular frame formed by tubes $b'$ $b^2$ fixed to a shell or casing $b$ and braced by a tube $b^3$ forming a bridge above the mold-disks. The connection of this cultivator-frame to the frame $c$ of the tractor is effected by the said shell $b$ which can oscillate upon the pivots $d'$ $d'$ of a crown $d$ (Figs. 4 and 5). This crown $d$ can oscillate upon the pivots $e'$ $e'$ of a second crown or ring $e$ itself adapted to turn freely around a shell or hollow piece $f$ fixed to the tractor-frame $c$ (Figs. 4 and 5).

The driving shaft $g$ operates the mold-disks $a$ by means of a pinion $g^2$, pinions $g^3$ $g^5$ upon a perpendicular shaft $g^4$ and a pinion $g^6$ keyed upon the shaft of the mold-disks; this shaft $g$ is divided, the two parts being connected by a Cardan joint $g'$, the perpendicular and horizontal axes of which lie in the respective planes of the corresponding pivots $d'$ $d'$ and $e'$ $e'$.

The angle made by the shaft $a'$ of the mold-disks with the line of travel can be altered by means of a rod $h$ universally pivoted to an arm integral with the bridge $b^3$ and to a bar $c'$ fixed to the tractor-frame $c$; this rod consists of two portions with right and left hand screw threads connected by a correspondingly screwed sleeve which allows of varying the length of the rod and therefore the inclination of the axis of the mold-disks in relation to the direction of travel. This manner of connection (by universal joint $g'$ and a pivoted rod $h$) allows the tractor to oscillate in accordance with the inequalities of the ground without affecting the position of the mold-disks. A suitably inclined wheel $j$ runs at the bottom of the furrow and prevents side movement. The position of the shaft $j'$ carrying this wheel can be adjusted according to the position of the disk-supporting shaft by means of sockets fixed upon the tubes $b'$ $b^2$ by screws. Rollers $i$ adjustable in height limit the depth of cultivation.

A winch $k$ operated by the engine allows of raising the cultivator frame for the maneuvering and transport of the cultivator. The cultivator-frame can easily be separated from the frame of the machine by dismounting the axes of the Cardan joints, so as to provide a simple tractor.

What I claim and desire to secure by Letters Patent is:

1. An automobile cultivator comprising a tractor frame, a cultivating frame, a shaft rotating in the cultivating frame, cultivating members mounted on said shaft, a shell fixed to the cultivating frame, a shell fixed to the tractor frame, a Cardan joint connecting the two shells, one element of the said Cardan joint being connected with one of the shells, and the other element being able to turn relatively to the other shell, and means for actuating the cultivating members.

2. An automobile cultivator comprising a tractor frame, a cultivating frame, a shaft rotating on the cultivating frame, cultivating members mounted on said shaft, a shell fixed to the cultivating frame, a shell fixed to the tractor frame, a Cardan joint connecting the two shells, a driving shaft rotating in the shell fixed to the tractor frame, an actuated shaft rotating in the shell fixed to the cultivating frame, a Cardan joint connecting the said shafts, and means for transmitting the motion of the actuated shaft to the cultivating members.

3. An automobile cultivator, comprising a tractor frame, a cultivating frame, a rotating shaft in the cultivating frame, cultivating members mounted on said shaft, a shell fixed to the cultivating frame, a shell fixed to the tractor frame, a Cardan joint connecting the two shells, a driving shaft rotating in the shell fixed to the tractor frame, an actuated shaft rotating in the shell fixed to the cultivating frame, a Cardan joint connecting the said shafts, means for transmitting the motion of the actuated shaft to the cultivating members, a rod articulated with the cultivating frame and with the tractor frame, and means for regulating the length of the said rod.

4. A cultivator, comprising a tractor provided with a frame having an engine thereon, a cultivating frame, a shaft mounted to rotate on the cultivating frame, cultivating members carried by said shaft, two concentric Cardan joints, the outer one of which connects the cultivating frame with the tractor frame, and a divided shaft one member of which is driven from the engine of the tractor, and the other member is operatively connected with the shaft carrying the cultivating members, the members of the shaft being connected by the said inner Cardan joint.

5. In a cultivator, a tractor provided with a frame having an engine thereon, a cultivator frame, cultivating members carried by said frame, a shell carried at the front of the cultivator frame, a second shell carried by the tractor frame and extending within the first shell, a universal joint connection between the said shells, and means for actuating the cultivating members from the engine of the tractor and including a divided shaft, and a universal joint connecting the members of said shaft.

6. In a cultivator, a tractor provided with a frame having an engine thereon, a triangular cultivator frame, a shell or casing carried at the front of the cultivator frame, a shell carried by the tractor frame at one side thereof, a universal joint connection between the said shells, a shaft at the rear of the cultivator frame, cultivating members carried by said shaft, means for adjusting said shaft to vary the inclination thereof relative to the direction of travel, and means for actuating the shaft carrying the cultivating members from the engine of the tractor.

7. An automobile cultivator, comprising a tractor provided with a frame having an engine thereon, a cultivator frame a Cardan joint connecting the cultivator frame with the tractor frame, cultivating members carried by the cultivator frame, means for operating the cultivating members from the engine and including a divided shaft and a Cardan joint connecting the members of said shaft, and a rod adjustable in length, and universally jointed to the cultivator frame and the tractor frame, to permit of varying the direction of the axis of the cultivating members in relation to the line of travel.

8. In an automobile cultivator, a tractor frame, a cultivating frame a Cardan joint connecting the cultivator frame with the tractor frame, a series of cultivating members carried by said cultivating frame, a driving shaft carried by the tractor frame, an actuated shaft carried by the cultivator frame and operatively connected with the cultivating members, a Cardan joint connecting the said shafts, a rod made in sections, a bar fixed to the tractor frame, one section of the rod being connected by a universal joint with said bar, and the other section having a universal joint connection with the cultivating frame, and means for adjusting the sections of the rod relative to each other to vary the length of the rod and thereby adjust the position of the cultivating members relative to the line of travel.

9. In a cultivator, a tractor provided with a frame having an engine thereon, a cultivator frame, a universal joint connection between the front end of the cultivator frame and the said tractor frame, a shaft carried at the rear of the cultivator frame, cultivating members carried by said shaft, a shaft comprising members one of which is driven from the engine of the tractor and the other is operatively connected with the shaft carrying the cultivating members, a universal joint connection between the members of said shaft, means for adjusting the cultivator frame to vary the inclination of the shaft carrying the cultivating members relative to the line of travel, a wheel adapted to run at the bottom of the furrow to prevent side movement, and means for adjusting the shaft carrying said wheel according to the position of the shaft carrying the cultivating members.

In testimony whereof I have signed my name to this specification, in the presence of two subscribing witnesses.

MARCEL LANDRIN.

Witnesses:
 JACQUES LEJEUNE,
 LEON PEILLY.